Figure 12:
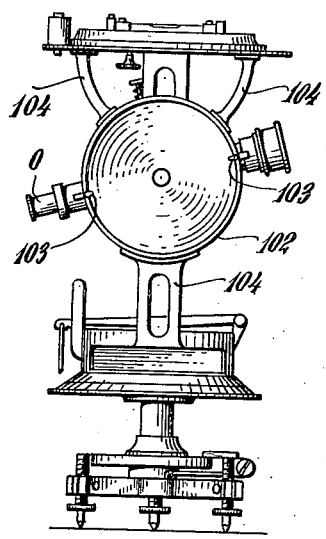

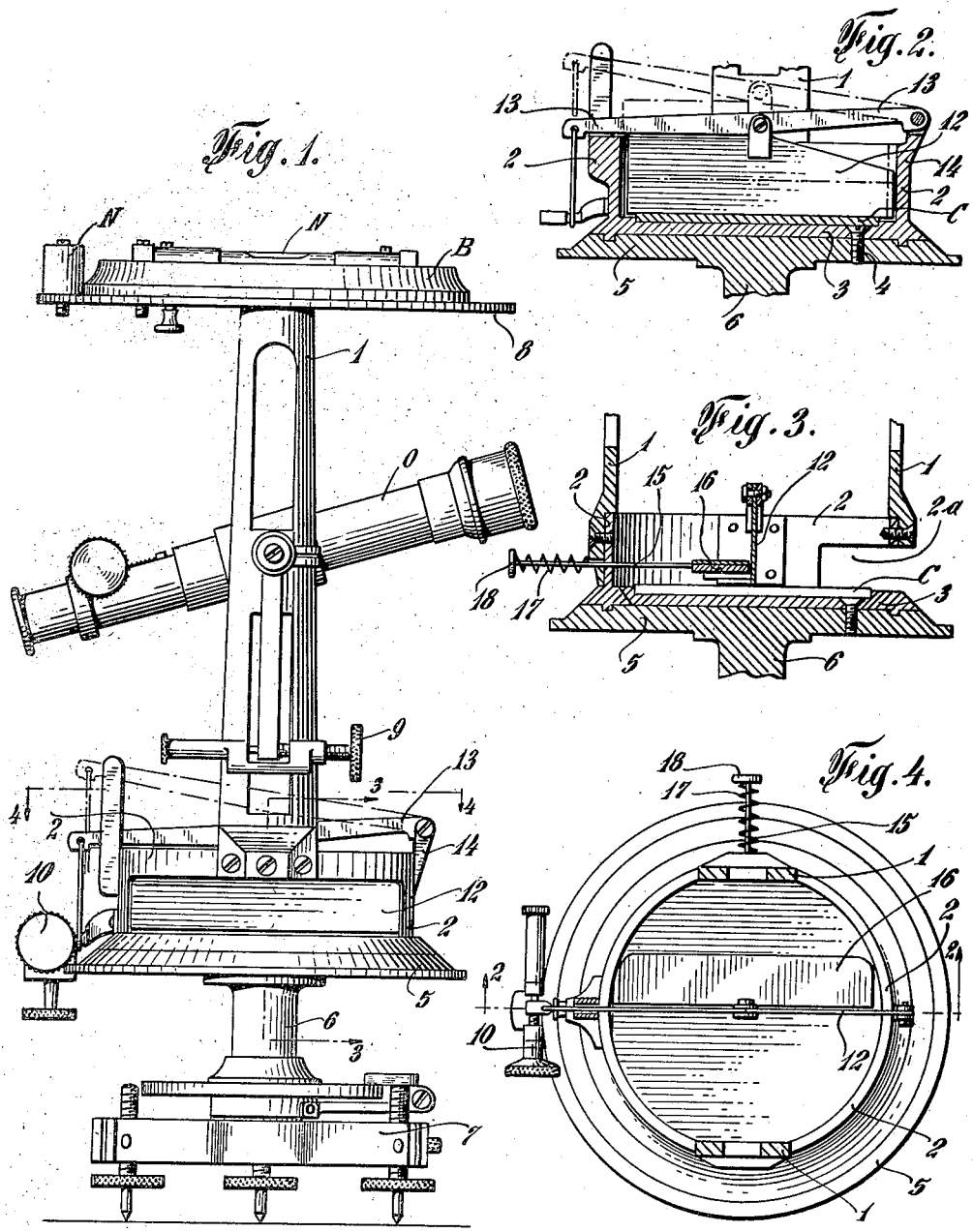

I. V. BAPTISTA.
THEODOLITE AND SIMILAR ANGLE MEASURING INSTRUMENT.
APPLICATION FILED FEB. 4, 1922.
1,429,555.
Patented Sept. 19, 1922.
3 SHEETS—SHEET 2.
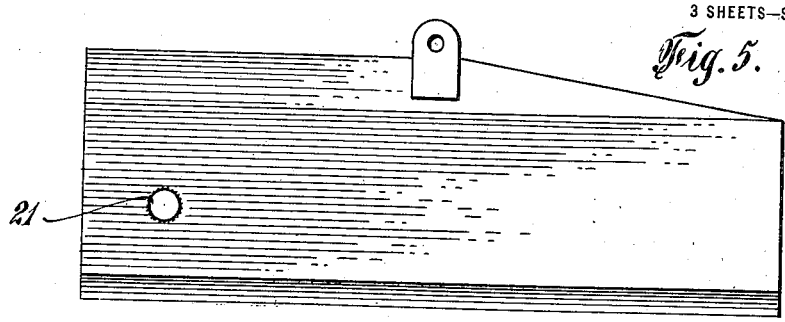
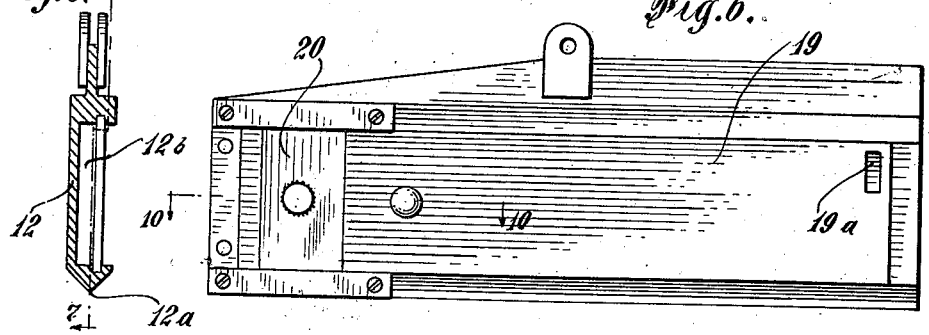
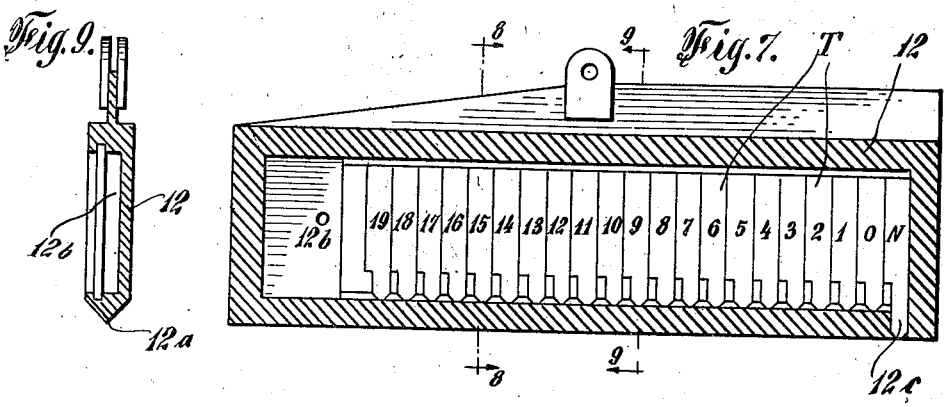
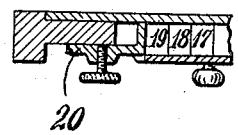

I. V. BAPTISTA.
THEODOLITE AND SIMILAR ANGLE MEASURING INSTRUMENT.
APPLICATION FILED FEB. 4, 1922.

1,429,555.

Patented Sept. 19, 1922.
3 SHEETS—SHEET 3.

Inventor
Ignacio Viriato Baptista
By his Attorney

Patented Sept. 19, 1922.

1,429,555

UNITED STATES PATENT OFFICE.

IGNACIO VIRIATO BAPTISTA, OF RIO DE JANEIRO, BRAZIL.

THEODOLITE AND SIMILAR ANGLE-MEASURING INSTRUMENT.

Application filed February 4, 1922. Serial No. 534,076.

*To all whom it may concern:*

Be it known that I, IGNACIO VIRIATO BAPTISTA, a citizen of the United States of Brazil, residing at Rio de Janeiro, Brazil, have invented certain new and useful Improvements in Theodolites and Similar Angle-Measuring Instruments, of which the following is a specification.

The invention relates to theodolites, repeating circles and other geodetic and topographic angle measuring instruments and has for its object to provide such instruments with manually operated means for recording on a cardboard disk the angles measured.

To this end the theodolite is provided with the following means for recording the horizontal angular measurements made: Means for supporting on that part of the instrument, which is kept stationary when horizontal angles are measured, a disk of cardboard or like material in a horizontal position such that the vertical axis on which the telescope of the theodolite revolves passes through the center of said disk; means for preventing the rotation or any other displacement of said disk supported in said horizontal position; means, manually operated, mounted on the frame supporting the telescope and which, when operated, print on said cardboard disk a straight line lying in the vertical plane passing through the optical axis of the telescope. It is clearly seen that a theodolite provided with such means for supporting a cardboard disk and printing on it a straight line, which reproduces exactly the optical axis of the instrument, can record on said disk all the angular measurements made with the instrument. For example, to record azimuths, a straight line is printed on the disk when the optical axis of the telescope lies in the plane of the meridian and a second straight line is printed when the point of which the azimuth is desired is sighted. Obviously, the two lines printed form acute angles, vertically opposed to each other, which are equal each to the azimuth measured by the instrument.

To record vertical angles, the theodolite is provided with the following means: Means for supporting vertically on the frame, on which rotate the trunnions on which the telescope revolves vertically, a cardboard disk at right angles to the horizontal axis on which the telescope revolves, said axis passing through the center of said disk; means for preventing the rotation or any other movement of said disk supported in said vertical position; supporting means, secured to one of the trunnions of the telescope; means, manually operated, carried by said supporting means, and which when operated, print on said cardboard disk, supported in the aforesaid manner, a straight line lying in a plane which passes through the optical axis of the instrument. The way the vertical angles measured with the instrument are recorded on the cardboard disk will be clear to those having a knowledge of geodetic or topographic field work.

The invention also includes, besides the above mentioned means for recording horizontal and vertical angles, means for printing on the cardboard disk, on which the angles are recorded, a serial number or letter adjacent each straight line printed, this being done, preferably, at the same time the straight line is printed.

The invention may be carried out in various ways. In the accompanying drawings: Figure 1 is a side elevation of a theodolite provided with means, according to the present invention, to record the measurement of horizontal angles; Fig. 2 is a fragmentary vertical cross section through the optical axis of the instrument; Fig. 3 is a fragmentary vertical cross section at right angles to that of Fig. 2; Fig. 4 is a horizontal cross section of the instrument; Figs. 5 and 6 are elevations of the printing plate, on a larger scale; Fig. 7 is a vertical cross section on line 7—7 of Fig. 8; and Figs. 8 and 9 are vertical cross sections on lines 8—8 and 9—9, respectively, of Fig. 7; Fig. 10 is a fragmentary horizontal cross section on line 10—10 of Fig. 7; Fig. 11 shows one of the types for printing numbers; Figs. 12 to 15 show a theodolite provided with means, according to the invention, to record the measurement of vertical angles.

The telescope O of the theodolite shown in Figs. 1 to 11 is mounted to revolve in a vertical plane on two standards 1, 1 vertically mounted on a cylindrical collar 2, the lower part of which surrounds a circular plate 3 secured concentrically, by means of set screws 4, to the circular base 5, on which the lower part of collar 2 rests. On the lower side of base 5 is provided a reduced extension 6 revolubly mounted on a tripod 7, the legs of which consist of thumb screws, by means of which base 5 can be levelled. A conical joint between circular plate 3 and collar 2 prevents the latter from leaving the base, at the same time that it is free to revolve inside plate 3. On top of standards 1, 1 rests a plate 8 on which is mounted a compass B and the levels N, n, to level the instrument. 9 and 10 are tangent motion screws to bring, respectively, the telescope O and the collar 2 precisely to the position in which the cross hairs of the former cover the point sighted. The base 5 is provided with a similar tangent motion screw, only a small part of which is shown in the drawing.

On top of circular plate 3 is provided a plane circular recess, concentric with the ring, on which is placed the disk C of strong cardboard secured to the plate by means of three screws which pass through openings on the cardboard disk and are screwed to the plate.

On the internal face of collar 2 are provided two vertical grooves, diametrically opposed to each other, lying in the vertical plane passing through the optical axis of the telescope. In said grooves is mounted, so that it can be raised and lowered, a printing plate 12, operated by means of a hand lever 13, pivoted to said plate and also to a bracket 14 provided on top of collar 2. The lower edge $12^a$ of plate 12 is bevelled (Figs. 8 and 9), the sharp edge thus formed lying exactly in the vertical plane containing the optical axis of the telescope, said edge being adapted to print a straight line on the disk C. At one side of collar 2 is mounted a stem 15, passing through an opening in the collar and adapted to have a horizontal radial motion. To the inner end of this stem, inside the collar, is secured a pad 16 for printing ink. The spring 17, coiled around stem 15, bears at one end on the head 18 at the outer end of the stem and at the opposite end on collar 2, keeping normally the stem in such a position that pad 16 is kept out of the way of the printing plate. When a line has to be printed on disk C, head 18 is pushed inwards against the action of spring 17 and pad 16 is moved into the way of the printing plate. Then, by means of lever 13, the latter is lowered against the pad and raised again, pressure on the head 18 being released, pad 16 returning to its former position, allowing plate 12 to be moved into printing position.

At one side of the plate 12 is provided a rectangular recess $12^b$ which extends through almost the whole length of it and in which are lodged, in a single row and in vertical position, printing types T, each bearing a figure on its lower end. These printing types are kept in position inside recess $12^b$ by means of a cover plate 19, which is capable of sliding in grooves provided in printing plate 12. A second cover plate 20, adjacent plate 19, is adapted to slide longitudinally of plate 12, in grooves provided in the latter and, when displaced in one direction, to carry the row of printing types T to one end of recess $12^b$. At this end of plate 12 there is provided an opening $12^c$, through which may be lowered, by its own weight, into printing position the type adjacent the end of recess $12^b$. The printing position is determined by a shoulder provided at one side of each type T (Figs. 7 and 11) which abuts against the bottom of recess $12^b$. A set screw 21 (Fig. 5) mounted on plate 12, serves to keep in position the printing type which is to be used. In this position the figure the type bears lies adjacent one of the ends of the edge $12^a$ of plate 12 and thus, when this edge prints a line on disk C, a figure will also be printed adjacent to said end of it.

Once printed, a line and its number, plate 19 is pulled back and with it plate 20, the printing type used being taken out. Then, plate 19 is again pushed forward and, by the opening thus formed between plates 19 and 20, the printing type previously removed is introduced in recess $12^b$. Plate 20 is, then, pushed forward, which makes the row of types advance anew, printing type bearing the next higher figure being lowered through opening $12^c$, into printing position.

On cover plate 19 there is provided a small opening $19^a$ (Fig. 6) through which a printing type which, for any reason, does not get into printing position by its own weight, may be made to take said position.

Figure 13:
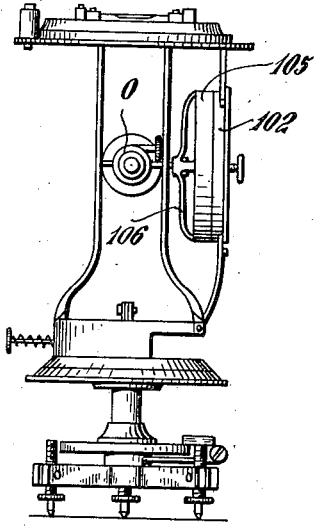
Figure 15:
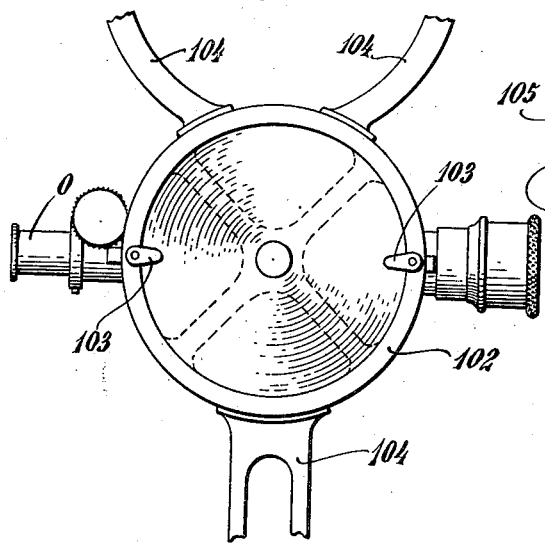
Figure 14:
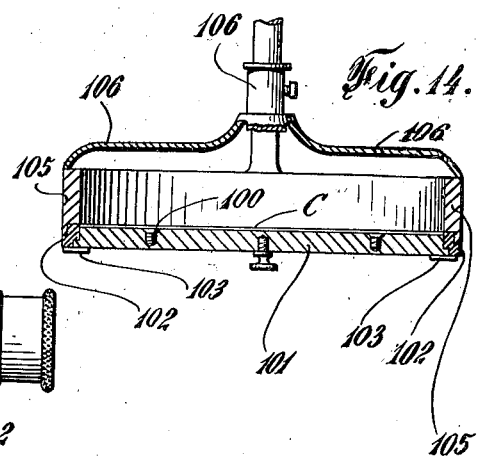

The theodolite above described is provided with means for recording horizontal angular measurements only. In Figs. 12 and 13 is shown in side and front elevations, respectively, the same instrument provided with means for recording vertical angles. Fig. 15 is a fragmentary side view of the theodolite and Fig. 14 is a cross section, along a diameter, of the support for the cardboard disk and for the printing device.

The cardboard disk C is secured, by means of screws 100, to a circular plate 101 inserted in a ring 102 and secured to it by means of latches 103 mounted on the ring. Ring 102 is secured to brackets 104 provided on the horizontal rotating frame on which is also mounted the telescope O, oscillating in a vertical plane. Ring 102 is arranged at right angles to the horizontal axis on which the telescope oscillates, said axis passing through the center of ring 102. On ring 102 is provided an external shoulder inside of which revolves another shoulder provided on a ring 105 which, by means of a spider 106, is secured to one of the trunnions of the telescope, ring 105 thus following the oscillating motion of the telescope in the vertical plate. Ring 105 carries the recording device for vertical angular measurements, which is not shown, but which is, in all respects, identical to the recording device for horizontal angular measurements of the theodolite described with reference to Figs. 1 to 11. The printing plate of said recording device for vertical angular measurements is mounted on grooves diametrically opposed to each other, provided on ring 105 and is adapted to print on the cardboard disk a straight line lying in the plane passing through the center of the disk and the optical axis of the instrument.

If, on the cardboard disk C, are printed two straight lines corresponding, respectively, to the horizontal position of telescope O and to its position when a sight is taken to any point, obviously, the lines will make with each other acute angles vertically opposed, each one of which will be equal to the angle formed by said point with the horizon, as viewed from the instrument.

Having thus fully described my invention, what I claim as new and desire to secure by Letters Patent is:

1. A theodolite or similar instrument, comprising means for supporting on and removably securing to that part of the instrument, which is kept stationary when angular measurements are being made, a cardboard disk having its center coinciding with the axis of the instrument; and recording means, manually operated, mounted on that part of the instrument which revolves on the stationary part, embodying a member adapted to print on the cardboard disk a straight line following a diameter lying in the vertical plane containing the optical axis of the instrument.

2. A theodolite or similar instrument, comprising means for supporting and removably securing to that part of the instrument, which is kept stationary when angular measurements are being made, a cardboard disk having its center coinciding with the axis of the instrument; and recording means, manually operated, mounted on that part of the instrument which revolves on the stationary part, embodying a member adapted to print on the cardboard disk a straight line following a diameter lying in the vertical plane containing the optical axis of the instrument and being also adapted to print on the cardboard disk a figure or a letter adjacent each of the straight lines printed by said recording means, said figure or letter being different for each line.

In testimony whereof I affix my signature.

IGNACIO VIRIATO BAPTISTA.